United States Patent [19]
Von Rüti

[11] 3,749,946
[45] July 31, 1973

[54] ELECRICAL CIRCUIT FOR THE TRANSFERRING AND AMPLIFICATION OF A PIEZOELECTRIC TRANSDUCER SIGNAL

[76] Inventor: Jürg Von Rüti, Villars-sur-Glanf, Switzerland

[22] Filed: May 27, 1971

[21] Appl. No.: 147,684

Related U.S. Application Data
[63] Continuation of Ser. No. 883,798, Dec. 10, 1969, abandoned.

[52] U.S. Cl. .................................. 310/8.1, 310/8.4
[51] Int. Cl. ............................................. H01v 7/00
[58] Field of Search .................. 310/8, 8.1, 8.3, 310/8.4, 8.7

[56] References Cited
UNITED STATES PATENTS

| | | | |
|---|---|---|---|
| 3,336,807 | 8/1967 | Van Lint et al. | 310/8.1 X |
| 3,489,932 | 1/1970 | Kopel et al. | 310/8.3 X |
| 3,390,286 | 6/1968 | Gradin et al. | 310/8.4 |
| 3,356,868 | 12/1967 | Cother | 310/8.4 |
| 3,400,284 | 9/1968 | Elazar | 310/8.4 |
| 3,569,747 | 3/1971 | Siegel | 310/8.4 X |

Primary Examiner—J. D. Miller
Assistant Examiner—Mark O. Budd
Attorney—George J. Netter

[57] ABSTRACT

A bipolar piezo-electric sensor is screened by a housing through which an insulated and screened bipolar lead extends. The signal lead is connected to the two signal input terminals of an amplifier circuit which is electrically insulated from ground. The amplifier circuit has two output terminals connected to the input terminals of a differential amplifier having an output terminal. In use, the difference between the symmetrical output signals of the amplifier circuit is converted into an asymmetrical signal which appears between the output terminal of the differential amplifier and ground.

7 Claims, 4 Drawing Figures

3,749,946

3,749,946

ELECRICAL CIRCUIT FOR THE TRANSFERRING AND AMPLIFICATION OF A PIEZOELECTRIC TRANSDUCER SIGNAL

RELATED APPLICATIONS

This application is a continuation of Ser. No. 883,798, filed Dec. 10, 1969, now abandoned.

THE INVENTION relates to an electrical circuit for transmitting and amplifying the output signal of a piezo-electric sensor which may be used for pressure, force or acceleration measurement. The sensor is bipolar and is screened by a housing, from which an insulated and screened bipolar signal lead extends the signal lead being connected to an amplifier circuit.

Electrical circuits of this type are used if physical magnitudes such as pressure, force or acceleration are to be measured using piezo-electric sensors and converted into electrical signals, e.g. in the measurement of the pressure and the pressure distribution in the cylinders of internal combustion engines and compressors, in the measurement of acceleration forces and in the supervision of operation of engines and other driving mechanisms, particularly of ship and aircraft driving mechanisms. In these cases it is often difficult to transmit the output signal of the piezo-electric sensor undistorted to the amplifier circuit, since the high-resistance signal lead between the sensor and the amplifier circuit is subject to considerable interferences. In particular interference is caused by magnetic alternating fields, by interference voltage, which arise because of earth current or mass currents (the mass is to be understood to mean the body which supports the sensor and the electrical circuit) and by electrostatic interference in the signalling lead.

For example, it is often not possible in aircraft and ships to create like potentials at the sites of installation of the sensor and of the amplifier circuit, which often have to be located at considerable distances apart. In ships, for example, there have been measured between separate units, potential differences of the order of 100 V and more. The individual units of the measuring and supervision circuit, in particular the sensor and the amplifier circuit, therefore, lie at different earth or mass potential. This potential difference builds up in the resistance of the screen between the housing of the sensor and that of the amplifier circuit, so that there are earth or mass currents through the screen, which because of the stray capacitances and the cable capacitances of the signal lead by electro-magnetic and electrostatic stray effects lead to interference signals, which can, even with small interference voltages, exceed the sensor output signal. These interference signals are, above all, considerable if asymmetrical signal amplifiers are used in which the one input is connected to earth.

In order to keep these measurement errors as small as possible, it is already known to use signal amplifiers with symmetrical inputs electrically insulated against earth or mass and to electrically insulate both conductors of the signal lead between the signal generator and the amplifier circuit insulated from earth or mass. In this case the output side of the amplifier circuit is asymmetrical whereby one output is at earth and the other electrically insulated output is coupled via a capacitor with its input to provide negative feedback. The said other input is connected through a capacitance of like size to earth or mass. The known circuit arrangement does, in fact, mitigate errors of the measuring signal due to earth currents and magnetic or electrostatic stray effects; however it leads to other measurement errors which affect the resultant measurement. In particular there arise interference signals due to asymmetry of the cable capacitances of the signal lead which is practically unavoidable. Furthermore, due to the interference voltage occuring as alternating voltage, potential displacements result at the input of the amplifier circuit, which make an expensive in-phase rejection necessary.

To avoid interference signals caused by an asymmetry of the cable capacitances an adjustment of the cable capacitances of both conductors of the signal lead by trimmer or stage capacitors is possible. A capacitive adjustment is, however, very difficult in industrial installations, particularly on ships and aircraft and, in the case of non-uniform cables, even impracticable. Also it is not always possible to provide the signal lead with an effective screen along its whole length. An arrangement of the sensor insulated against the earth or mass potential, which would to a large extent obviate the interference signals, is not successful in practice. As it has been shown, in this case there are formed even after a relatively short operational time, e.g. by pollution of the insulation or by the formation of carbon deposits, current bridges, through which the insulation becomes ineffective. Furthermore, there results further difficulties, if several measuring channels with their own amplifiers are present, which all have to be fed by the same current source.

An object of the present invention is to provide an electrical circuit for transmitting and amplifying the output signal of a piezo-electric sensor in which at least one of the stated problems of the known circuits is alleviated.

In accordance with the present invention there is provided an electrical circuit for transmitting and amplifying the output signal of a piezo-electric sensor, which is bipolar and is screened by a housing from which an insulated and screened bipolar signal lead extends, comprising an amplifier circuit which is electrically insulated from earth or mass potential and has two input terminals and two output terminals, the signal lead being connected to the input terminals, and a differential amplifier having two input terminals connected to the output terminals of the amplifier circuit and an output terminal, the difference between the signals at the output terminals of the amplifier circuit being converted, in use, into an asymmetrical voltage signal between the output terminal of the differential amplifier and earth or mass potential as a reference potential.

In the electrical circuit in accordance with this invention, wherein the amplifier circuit is insulated against the earth or mass potential, the whole electrical circuit, serving to transmit and amplify the sensor output signal, is only earthed at one point. Therefore, in the screen of the signal lead practically no earth or mass currents flow so that interference on the high-resistance signal lead is practically completely suppressed because of the capacitances between the conductors and the screen. The stray capacitances of the two conductors can, because of the electrically symmetrical construction of the amplifier circuit and by twisting both of the conductors at those places, at which a screen is not possible, be maintained at the same size, so that also the interference signals caused by the stray capacitances do not distort the resultant measurement. Poor insulating strengths between the conductors of the signalling lead and the screen have, even if they are unequal, only a little influence on the frequency response and on the sensitivity of the circuit in accordance with the invention. Since at the input of the amplifier circuit no potential displacements follow through earth circuit voltage, no high-frequency and quick in-phase rejection is necessary, by which the construction of the amplifier circuit is simplified. The balancing out of the output signals of the amplifier leaving as voltage difference for the signal amplification to the earth or mass potential is effected by the differential amplifier connected on the output side of the amplifier circuit.

Preferably the electrical circuit comprises a voltage stabilizer from which the amplifier circuit is energised and which has a reference potential lead connected to the electrical screen of the signal lead, the screen being connected to earth or mass potential adjacent to the sensor only.

This prevents the supply of the amplifier circuit creating an interference voltage at the screen.

Preferably the voltage stabilizer, comprises a Zener diode. Preferably the screen is connected to the housing of the sensor which is at earth or mass potential.

Conveniently a resistor is connected between the screen and the earth or mass potential adjacent to the amplifier circuit and serves to complete the path for the supply current of the amplifier circuit.

Alternatively a resistor is connected between the screen and terminal intended to be supplied with a potential which has the opposite sense relative to the earth or mass potential to the supply potential of the amplifier circuit, the resistor serving to complete the path for the supply current of the amplifier circuit.

Preferably there is connected between the voltage stabilizer and a supply terminal for the amplifier circuit a switch element having a high internal resistance.

The switching element is preferably a field effect transistor. The source-drain path of the field effect transistor is connected in the supply current circuit and its gate is short-circuited to its source-electrode. This feature also serves to eliminate substantially interference voltages along the screen of the signal lead.

In one arrangement in accordance with this invention the amplifier circuit comprises a symmetrically formed signal amplifier having two input terminals and two output terminals, each output terminal being connected through a capacitor to an individual input terminal.

In another arrangement in accordance with this invention the amplifier circuit comprises two asymmetrical signal amplifiers each having an input terminal and an output terminal and each being provided with a capacitor connected between its input and output terminals, the reference potential of the amplifiers being that of the screen of the signal lead, and the input terminal of each amplifier being connected with an individual conductor of the signal lead, whereby, in use, the amplifiers convert the output signal of the sensor into two voltages symmetrical to the potential of the screen.

In both arrangements the characteristic virtual capacitance of signal amplifiers between the inputs and earth or mass potential for both inputs of the amplifier circuit are the same size so that neither the cable capacitances parallel to the virtual capacitances nor the insulation strengths of the signal lead have a disadvantageous effect on the frequency response and the sensitivity of the circuit.

Embodiments of the present invention will now be described, by way of example only, with reference to the accompanying drawings in which.

Figure 1:
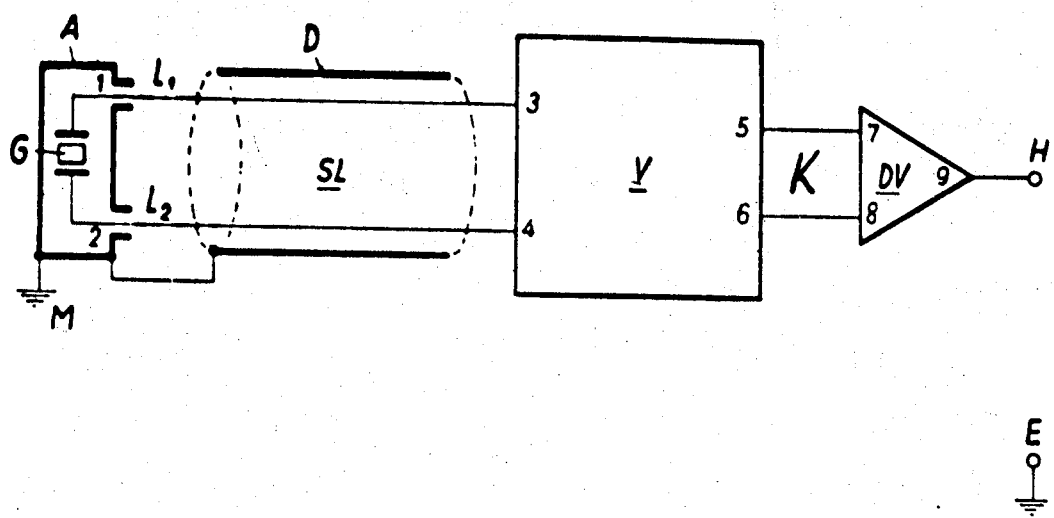
FIG. 1 is a simplified basic circuit diagram of a circuit in accordance with the invention.

Referring first to FIG. 1 a bipolar piezo-electric sensor G, which is disposed in a metal housing A, has two output leads 1 and 2 which extend through the housing A in an electrically insulated manner. The output terminals 1, 2 are connected by a signal lead SL having two conductors $L_1$ and $L_2$ surrounded by an electrical screen D, to an amplifier circuit V. The amplifier circuit V is electrically insulated from earth or mass potential and has, in all, four electrically insulated connecting terminals, that is to say, two input terminals 3, 4 and two output terminals 5, 6. The two input terminals 3, 4 are connected to the conductors $L_1$, $L_2$ respectively of the signalling lead SL and the output terminals 5, 6 are connected to one end of a bipolar cable K the other end of which is connected to input terminals 7, 8 of a differential amplifier DV. The output 9 of the differential amplifier DV is connected to an output terminal given the reference H, which acts as the signal output of the circuit. There is assigned to the output terminal H a further terminal E which is at earth or mass potential and supplies the reference potential for the signal output. The earthing point of the housing A of the sensor G is given the reference M.

The piezo-electric sensor G can be a pressure, force or acceleration transmitter. Due to a mechanical force acting on the sensitive element of the sensor G there is applied between the output terminals 1, 2, a signal, which is fed via the conductor $L_1$ and $L_2$ of the signal lead SL to the amplifier circuit V. At the output terminals 5, 6 of the amplifier circuit V there then appears voltage signals symmetrical to each other, which are supplied to the differential amplifier DV via the cable K. The differential amplifier DV amplifies the voltage signals and converts the difference between the two output voltages of the amplifier circuit V into a voltage signal asymmetrical to earth or mass potential, which signal can be obtained between the terminals H and E of the circuit. The whole circuit is only earthed via the housing A of the sensor G at the point M. The screen D is electrically connected to the housing H, as can be seen from FIG. 1. Because of this "floating" arrangement of the amplifier circuit V earth circuit or mass circuit currents through the screen D are prevented, so that no interference voltages arise along the screen D and no interference signals can distort the sensor signal present in the signal lead SL.

Figure 2:
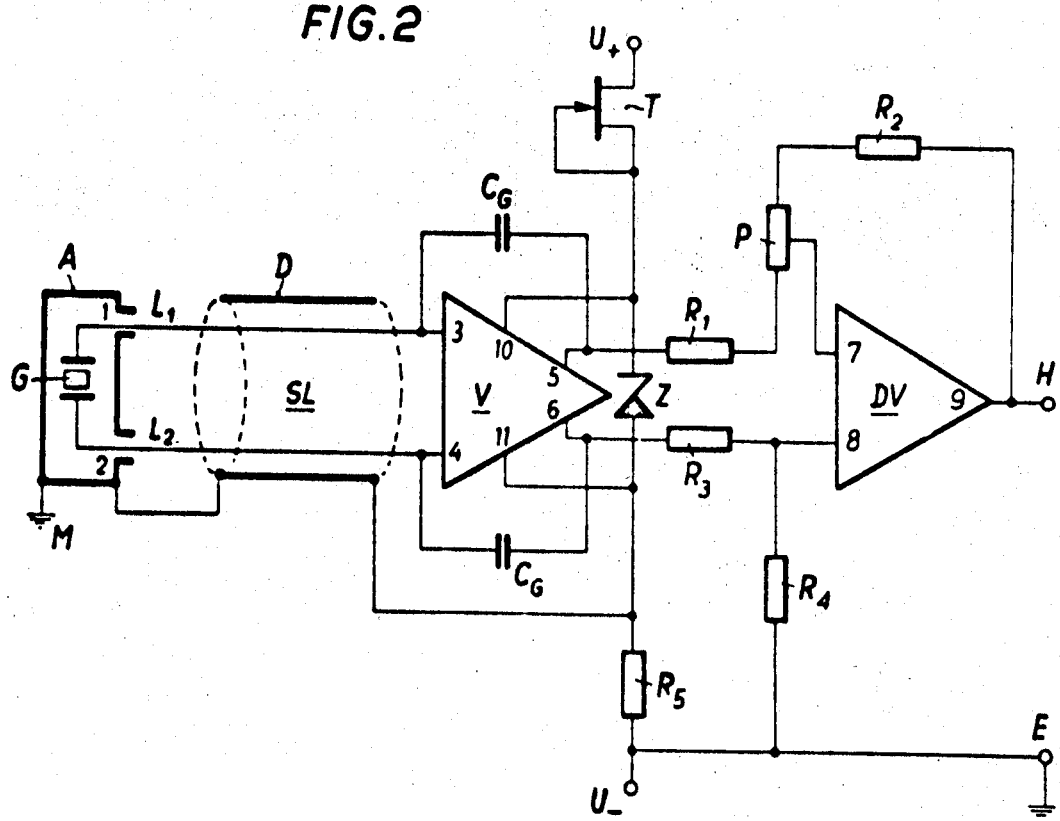
FIGS. 2 and 3 are circuit diagrams of preferred embodiments of the invention.

In the embodiment shown in FIG. 2 the amplifier circuit consists of a symmetrically designed amplifier V, whose output terminals 5, 6 are electrically connected via a negative feedback capacitor $C_G$ with the input terminals 3, 4 respectively. Further, the output terminal 5 of the amplifier V is connected via three resistances, namely resistor $R_1$, potentiometer P and resistor $R_2$, in series in that order, to the output 9 of the differential amplifier DV. The wiper of the potentiometer P is connected to the input terminal 7 of the differential amplifier DV. Between the output terminal 6 of the signal amplifier V and the input terminal 8 of the differential amplifier DV, a resistor $R_3$ is connected. Furthermore, the input terminal 8 is connected via a resistor $R_4$ to the terminal E, which is at the earth or mass potential and which is physically adjacent to the amplifier V or the differential amplifier DV.

In order to supply the necessary supply voltage, the signal amplifier V has two terminals 10, 11 which are energised via a voltage stabilizer. The latter in the exemplary embodiment illustrated, consists of a Zener diode, whose cathode is connected to the terminal 10 and whose anode is connected to the terminal 11. Further there is connected between the positive terminal $U_+$ of the supply voltage source and the Zener diode Z a switching element with a high internal resistance. The switching element is a field effect transistor T, whose source-drain path is connected in the supply circuit whose gate is short-circuited to its source-electrode. The supply terminal 11 of the signal amplifier V is also electrically connected to the screen D of the signal lead SL. A resistor $R_5$ is connected between the screen D and the earth or mass potential E adjacent to the amplifier circuit which serves to feed back the feed current. The negative terminal $U_-$ of the supply source is similarly connected to the electrical reference point E of the circuit.

Since the circuit is only earthed adjacent to the sensor G, i.e., at the point M, the whole voltage difference, which arises through potentials differing and varying from each other between the earthing points M and E, occurs virtually only across the resistor $R_5$, which can be made correspondingly great, so that any interference voltage still existing at the screen is of no importance. An alternating voltage occuring across the resistor $R_5$ is eliminated by the differential amplifier DV from the output signal appearing between the terminals H and E. The in-phase rejection with reference to the input signal of the circuit in this case depends on the relationship of the resistors $R_2$ and $R_1$ and that of the resistors $R_4$ and $R_5$. The potentiometer P serves to adjust these two relationships, which should be as similar as possible, and renders possible in this way an optimisation of the in-phase rejection of the whole circuit.

Figure 3:
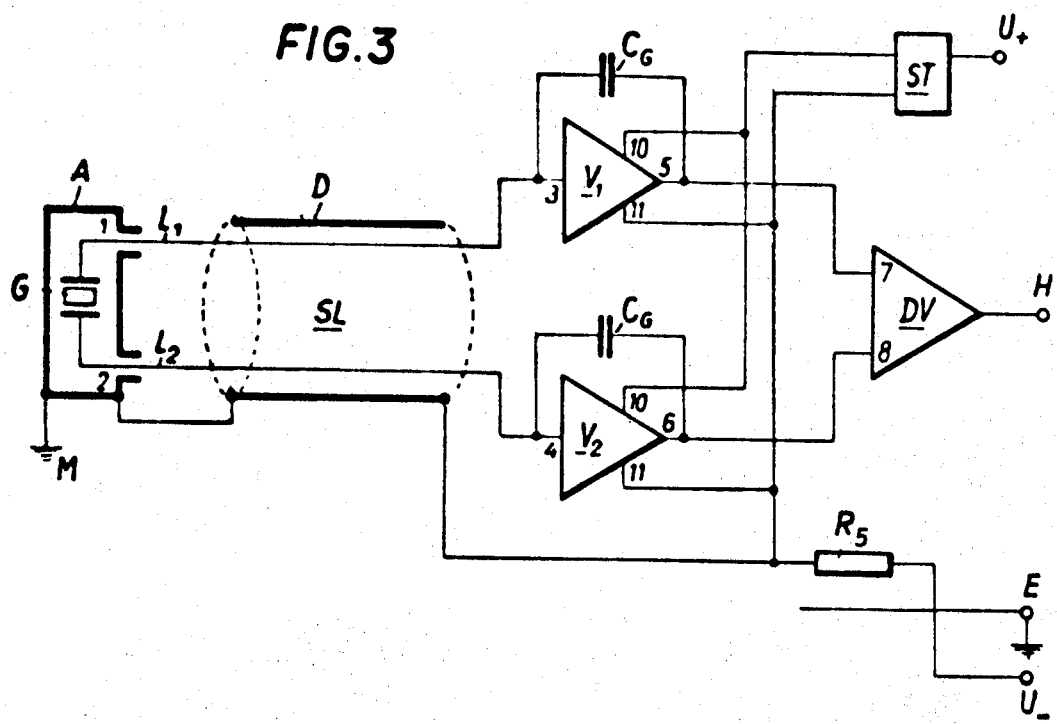

FIG. 3 shows a further exemplary circuit in accordance with the invention, in which the amplifier circuit serving to amplify the signal consists of two asymmetrical signal amplifiers $V_1$ and $V_2$, which are each provided with a negative feed-back capacitor $C_G$ connected between the input terminals 3, 4 and output terminals 5, 6 respectively. The input terminals 3, 4 of the two amplifiers $V_1$, $V_2$ are connected to the conductors $L_1$, $L_2$ respectively of the signal lead SL and the two output terminals 5, 6 are connected to the input terminals 7, 8 respectively of the differential amplifier DV. The reference potential of the two signal amplifiers $V_1$, $V_2$ is that of the screen D of the signal lead SL, which is earthed only via the housing A at the point M adjacent to the sensor G.

Through the use of two asymmetrical signal amplifiers $V_1$, $V_2$ there occur, at the output terminals 5, 6 of the amplifier circuit, voltage signals which are symmetrical to each other, which are amplified by the differential amplifier DV and which are available between the terminals H and E asymmetrical to the earth or mass potential. In this case too, interference signals on the signal lead SL are substantially suppressed by the "floating" arrangement of the signal amplifiers $V_1$, $V_2$. Further, there is provided a potential-free feed for the signal amplifiers $V_1$, $V_2$ via a voltage stabilizer ST. The difference from the circuit shown in FIG. 2 is that the feedback resistor $R_5$ serving to complete the circuit for the supply current is not connected to the earth or mass potential E but is connected to a point at a potential negative in relation to the earth or mass potential E. The value of the resistor $R_5$ can in this way be suitably increased, whereby a further reduction of the interference voltage at the screen D of the signal lead SL is obtained.

Figure 4:
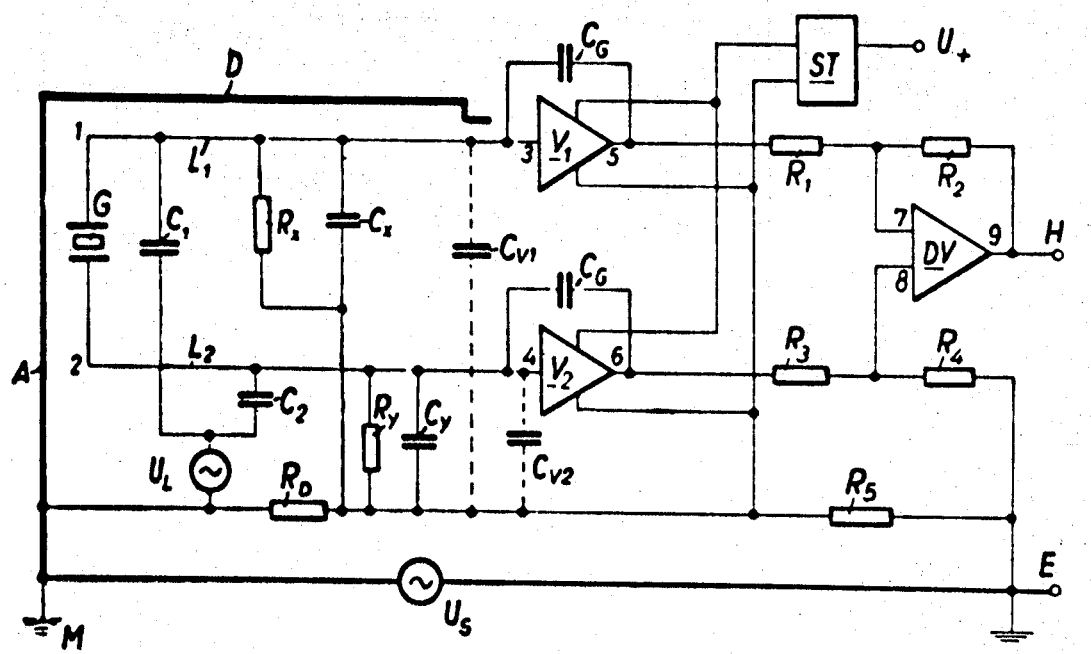
FIG. 4 is an equivalent circuit diagram of a circuit in accordance with the invention.

In the equivalent circuit diagram of a circuit in accordance with the invention shown in FIG. 4, $C_1$ and $C_2$ denote the stray capacitances of the interference voltage $U_L$ on the conductors $L_1$ and $L_2$ of the signal lead, $R_x$ and $R_y$ the insulation resistances of the conductors with respect to the screen D and $C_x$ and $C_y$ the cable capacitances between the conductors and the screen D. $R_D$ denotes the internal resistance of the screen D and $U_S$ the alternating voltage occuring because of the potentials differing and varying from each other between the two earth points M and E; the virtual capacitances of the amplifiers $V_1$, $V_2$ against the screen D are denoted by $C_{V1}$ and $C_{V2}$. Furthermore, in FIG. 4 the resistors $R_1$ and $R_3$ connected between the signal amplifiers and the differential amplifiers as well as the negative feedback resistors $R_2$ and $R_4$ of the differential amplifier DV are shown. The supply is provided by a voltage stabilizer ST, and the feedback resistor $R_5$ is shown connected in the circuit between the screen potential and the mass potential E.

The equivalent circuit diagram shown in accordance with FIG. 4 renders it easier to understand the operation of a circuit in accordance with the invention. The negative feedback capacitors $C_G$ of the two charge amplifiers $V_1$ and $V_2$ are charged by the output of the sensor G, which occurs at the output terminals 1, 2. In this way there occurs at the output terminals 5, 6 of the signal amplifier symmetrical charge signals, which are amplified by the differential amplifier DV and whose difference is available at the two output terminals H and E of the circuit as an asymmetrical voltage signal with reference to the earth or mass potential. In this way any distortion of the measuring signal by interference voltages, which originate from magnetic alternating fields and earth or mass currents is suppressed.

The stray capacitances $C_1$, $C_2$ can be maintained symmetrical by twisting the conductors $L_1$, $L_2$ especially at those parts of the signal lead which cannot be sufficiently screened, so that the influence of signals arising in the conductors $L_1$, $L_2$ by capacitative coupling of the interference voltage $U_L$ is eliminated. The cable capacitances $C_x$, $C_y$ are however different from each other because of the unavoidable asymmetries of the cable. Through the "floating" arrangement of the signal amplifiers $V_1$, $V_2$ significant build up of interference voltage at the resistance $R_D$ of the screen D is prevented. The interference voltage $U_S$ occurs practically only at the resistor $R_5$ which is greater by several magnitudes than the resistance $R_D$. The transfer of interference signals via the cable capacitances $C_x$, $C_y$ onto the signal lead is therefore also avoided. In this way there occurs no potential displacement between the inputs 3 and 4 of the signal amplifiers and of the reference potential formed by the screen D, and the virtual capacitances $C_{V1}$ and $C_{V2}$ are similar. Since the virtual capacitances of signal amplifiers are very high, the relativly small cable capacitances $C_x$ and $C_y$ parallel thereto have practically no influence on the frequency response and on the sensitivity of the circuit. For the same reason the influence of the insulation resistances $R_x$ and $R_y$ is also negligable. A very substantial in-phase rejection of interference signals is attained by the circuit in accordance with the invention. I claim:

1. An electrical circuit comprising:
   a bipolar piezoelectric sensor;
   a housing in which the sensor is disposed, which screens the sensor;
   an insulated bipolar signal lead which extends through the housing and which is screened by an electrical screen;
   an amplifier circuit which is electrically insulated from ground potential and has two input terminals and two output terminals, the signal lead being connected to the input terminals of the amplifier circuit;
   a differential amplifier having two input terminals, which are connected to the output terminals of the amplifier circuit, and an output terminal, the difference between the signals at the output terminals of the amplifier circuit being converted, in use, into an asymmetrical voltage signal between the output terminal of the differential amplifier and ground potential which acts as a reference potential;
   means interconnecting the housing to ground potential; and
   means connecting the housing and signal lead screen whereby said housing and said screen are connected to ground potential at a single point adjacent said sensor.

2. An electrical circuit comprising:
   a bipolar piezoelectric sensor;
   a housing in which the sensor is disposed, which screens the sensor;
   an insulated bipolar signal lead which extends through the housing and which is screened by an electrical screen;
   an amplifier circuit which is electrically insulated from ground potential and has two input terminals and two output terminals, the signal lead being connected to the input terminals of the amplifier circuit;
   a differential amplifier having two input terminals, which are connected to the output terminals of the amplifier circuit, and an output terminal, the difference between the signals at the output terminals of the amplifier circuit being converted, in use, into an asymmetrical voltage signal between the output terminal of the differential amplifier and ground potential which acts as a reference potential; and
   a voltage stabilizer from which the amplifier circuit is energized and which has a reference potential lead connected to the electrical screen of the signal lead, the screen being connected to ground potential adjacent to the sensor only.

3. An electrical circuit as claimed in claim 2, which comprises a resistor which is connected between the screen and ground potential adjacent to the amplifier circuit and which serves to complete the path for the supply current of the amplifier circuit.

4. An electrical circuit as claimed in claim 2, which comprises a supply terminal and a resistor, the resistor being connected between the screen and the supply terminal to which there is applied a potential which has the opposite sense relative to ground potential to the supply potential of the amplifier circuit, the resistor serving to complete the path for the supply current of the amplifier circuit.

5. An electrical circuit as claimed in claim 2, which comprises a supply terminal for the amplifier circuit and a switch element having a high internal resistance, the switch element being connected between the voltage stabilizer and the supply terminal.

6. An electrical circuit comprising:
   a bipolar piezoelectric sensor;
   a housing in which the sensor is disposed, which screens the sensor;
   an insulated bipolar signal lead which extends through the housing and which is screened by an electrical screen;
   a symmetrical signal amplifier circuit which is electrically insulated from ground potential and having two input terminals and two output terminals and two capacitors, the signal lead being connected to the input terminals of the amplifier circuit and each output terminal being connected through an individual capacitor to an individual input terminal; and
   a differential amplifier having two input terminals, which are connected to the output terminals of the amplifier circuit, and an output terminal, the difference between the signals at the output terminals of the amplifier circuit being converted, in use, into an asymmetrical voltage signal between the output terminal of the differential amplifier and ground potential which acts as a reference potential.

7. An electrical circuit comprising:
   a bipolar piezoelectric sensor;
   a housing in which the sensor is disposed, which screens the sensor;
   an insulated bipolar signal lead which extends through the housing and which is screened by an electrical screen;
   an amplifier circuit including two asymmetrical signal amplifiers each having an input terminal and an output terminal and each being provided with a capacitor connected between its input and output terminals, the reference potential of the amplifiers being that of the screen of the signal lead, and the input terminal of each amplifier being connected with an individual conductor of the signal lead, whereby, in use, the amplifiers convert the output signal of the sensor into two voltages symmetrical to the potential of the screen; and
   a differential amplifier having two input terminals, which are connected to the output terminals of the amplifier circuit, and an output terminal, the difference between the signals at the output terminals of the amplifier circuit being converted, in use, into an asymmetrical voltage signal between the output terminal of the differential amplifier and ground potential which acts as a reference potential.

* * * * *